Feb. 25, 1941.      W. H. DE LANCEY              2,233,246
                       FLUID METER
                  Filed Dec. 24, 1938        6 Sheets-Sheet 2

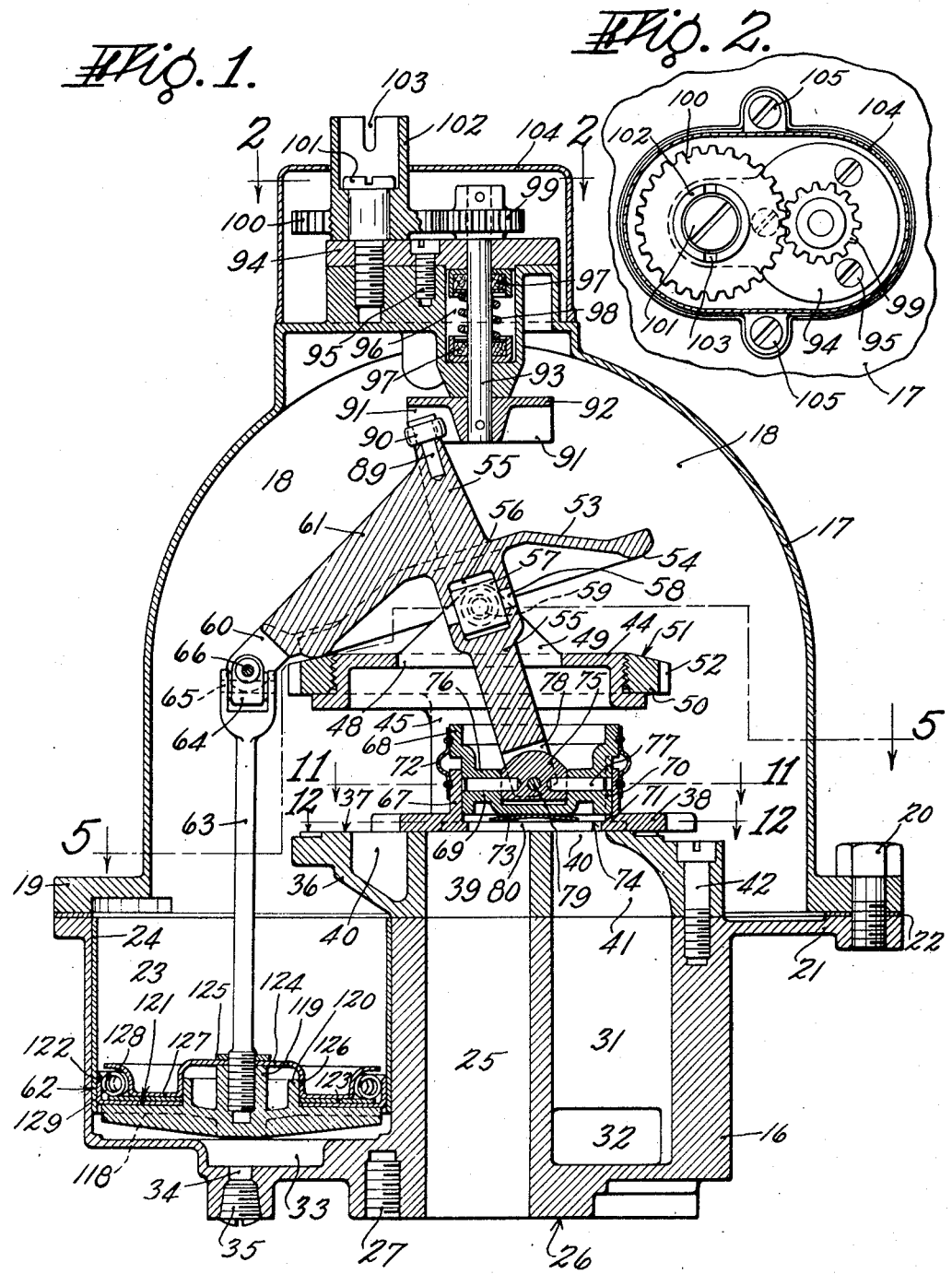

INVENTOR
WARREN H. DE LANCEY
BY Chapin & Neal
ATTORNEYS

Feb. 25, 1941.    W. H. DE LANCEY    2,233,246
FLUID METER
Filed Dec. 24, 1938    6 Sheets-Sheet 3

INVENTOR
WARREN H. DE LANCEY
BY
*Chapin + Neal*
ATTORNEYS

INVENTOR
WARREN H. DE LANCEY
BY Chapin & Neal
ATTORNEYS

Feb. 25, 1941. W. H. DE LANCEY 2,233,246
FLUID METER
Filed Dec. 24, 1938 6 Sheets-Sheet 5

INVENTOR
WARREN H. DE LANCEY
BY Chapin & Neal
ATTORNEYS

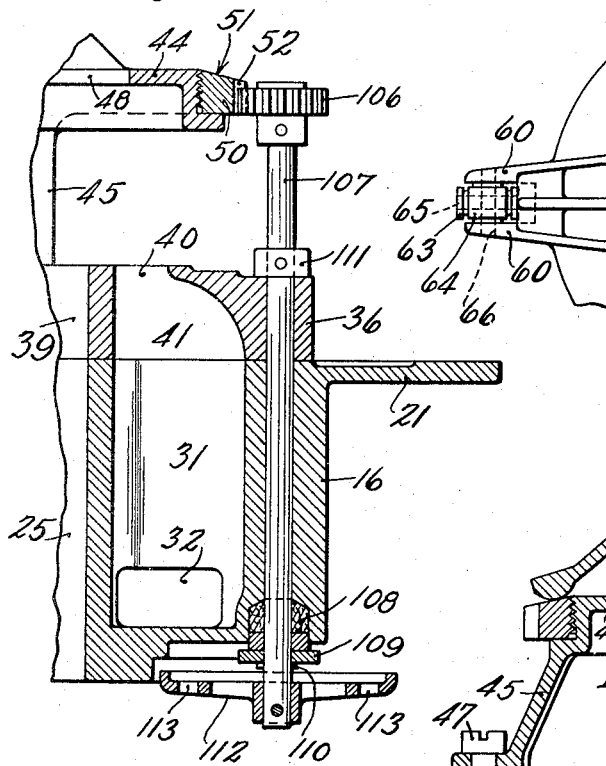
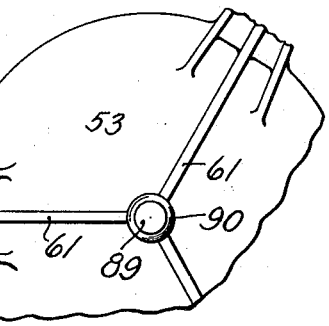
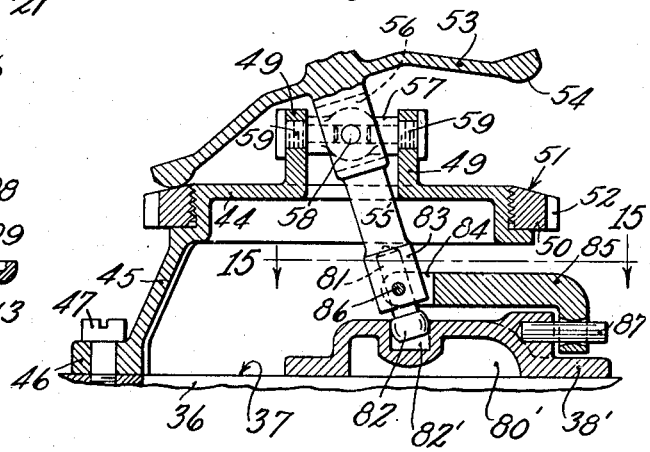
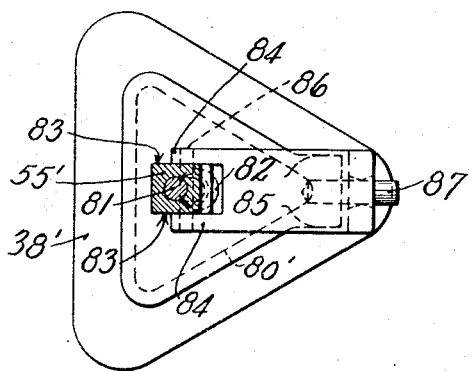

Patented Feb. 25, 1941

2,233,246

UNITED STATES PATENT OFFICE 2,233,246

FLUID METER

Warren H. De Lancey, Springfield, Mass., assignor to Gilbert & Barker Manufacturing Company, West Springfield, Mass., a corporation of Massachusetts Application December 24, 1938, Serial No. 247,687

4 Claims. (Cl. 73—244)

This invention relates to improvements in displacement meters of the type wherein reciprocating pistons actuate the distributing valve through the intermediary of a wobble plate.

The invention has for one object an improved mounting of the wobble plate by a means which provides for the necessary nutating motion of said plate and at the same time restrains it against axial displacement in both directions and also against rotation about its own axis.

Another object is to provide, as an addition to the above described arrangement, a connection between the valve and that part of the wobble plate which actuates it, such connection being supplementary to the usual connection, and acting to prevent relative rotation of such part and valve about the central axis of the valve.

A further object is to provide an improved form of valve, having an upstanding tubular hub with a piston-like part slidably and telescopically engaged therewith and suspended by a gimbal joint from the valve-actuating-part of the wobble plate,—this arrangement serving to relieve the valve of a large portion of the liquid pressure acting against it, the thrust on the piston-like part being transferred to said actuating part and thence through the wobble plate to its support.

Another object is to provide, as an addition to the last described arrangement, a means for preventing relative rotation of the valve and the piston-like part with which it is telescopically engaged.

Another object is to provide, in a meter of the type described, a generally simplified and improved construction and arrangement of parts, enabling important economies in manufacture.

These and other objects will best be understood as the detailed description proceeds and they will be pointed out in the appended claims.

The invention will be disclosed with reference to the accompanying drawings, in which:

Fig. 1 is a sectional elevational view of a meter embodying the invention;

Fig. 2 is a sectional plan view taken on the line 2—2 of Fig. 1;

Figure 5:
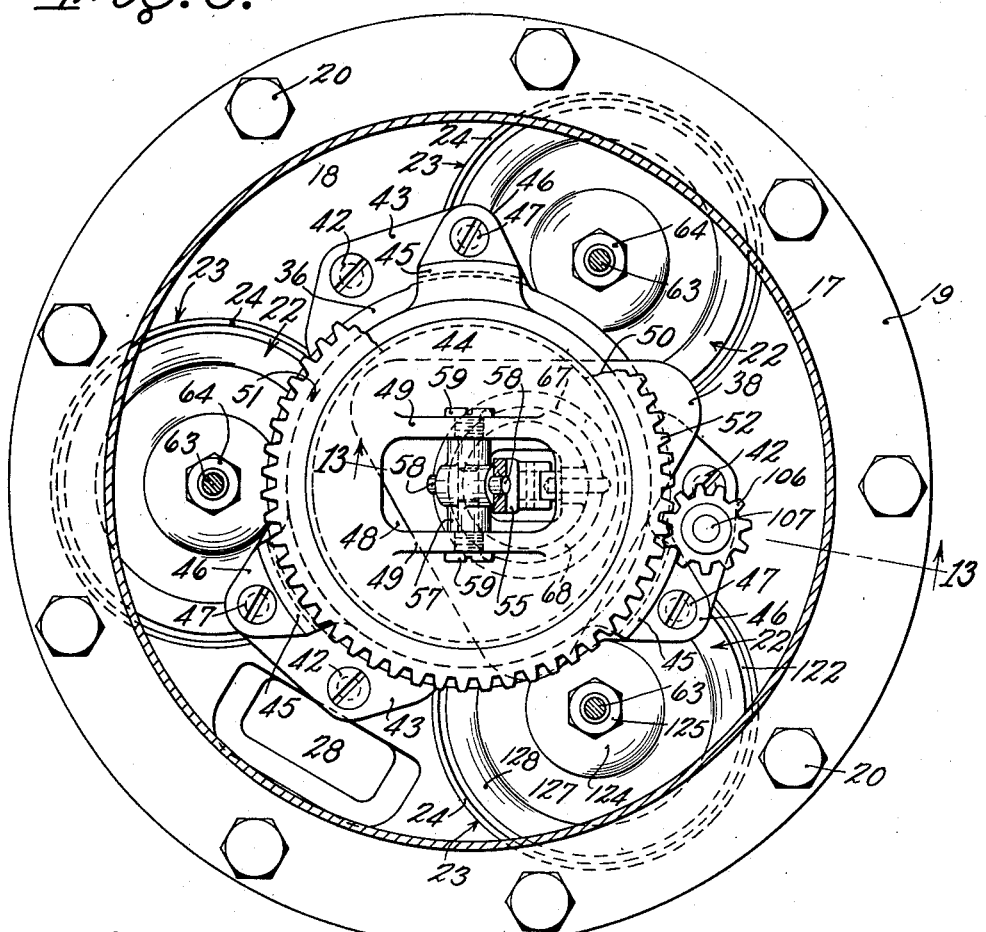
Fig. 5 is a sectional plan view taken on the line 5—5 of Fig. 1.
Figure 11:
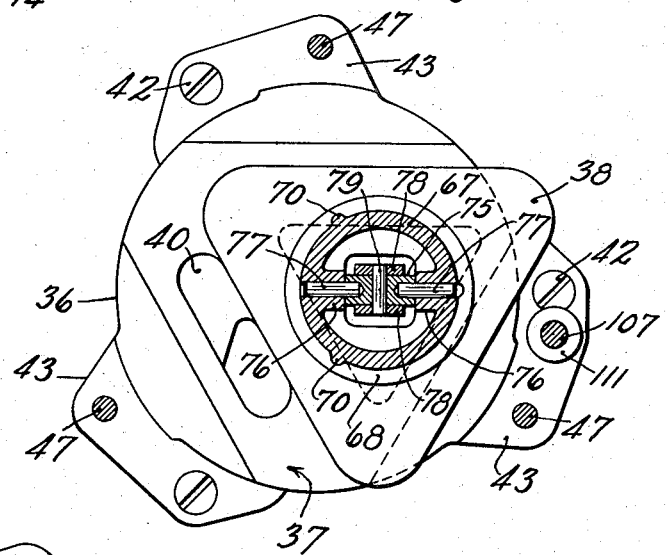
Figure 12:
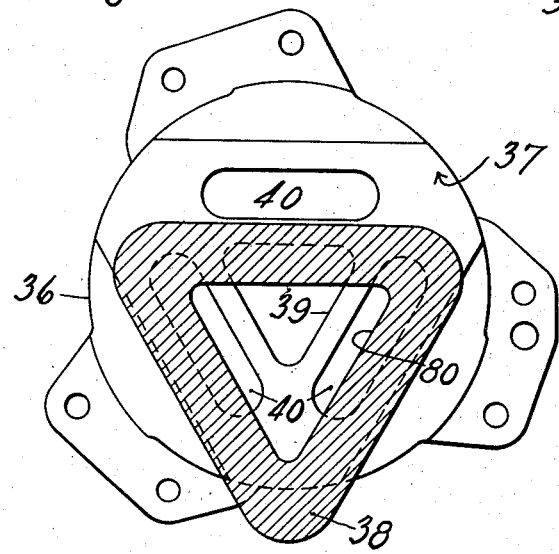

Figs. 11 and 12 are sectional plan views taken on the lines 11—11 and 12—12 respectively, of Fig. 1;

Fig. 13 is a fragmentary sectional view taken on the line 13—13 of Fig. 5;

Fig. 14 is a fragmentary cross sectional view of the meter showing a different form of valve;

Fig. 15 is a sectional plan view taken on the line 15—15 of Fig. 14; and

Fig. 16 is a fragmentary top plan view of the wobble plate showing the means for connecting the piston rods thereto.

Referring to these drawings, the meter includes two main casing elements—a body 16 and a cover 17 (Fig. 1)—both of which may advantageously be formed as die castings of any suitable metal, such as aluminum, for example. The body 16 contains the cylinders and supports the pistons, valve and valve operating means, while the cover supports the register driving connections and forms within it a chamber 18 within which the valve and its operating mechanism are housed. The cover, of inverted cup-shape, has an annular flange 19 which is secured by a circular series of cap screws 20 to the circular plate-like portion 21 of the body,—a gasket 22 being interposed between the body and cover to seal the joint therebetween.

Figure 3:
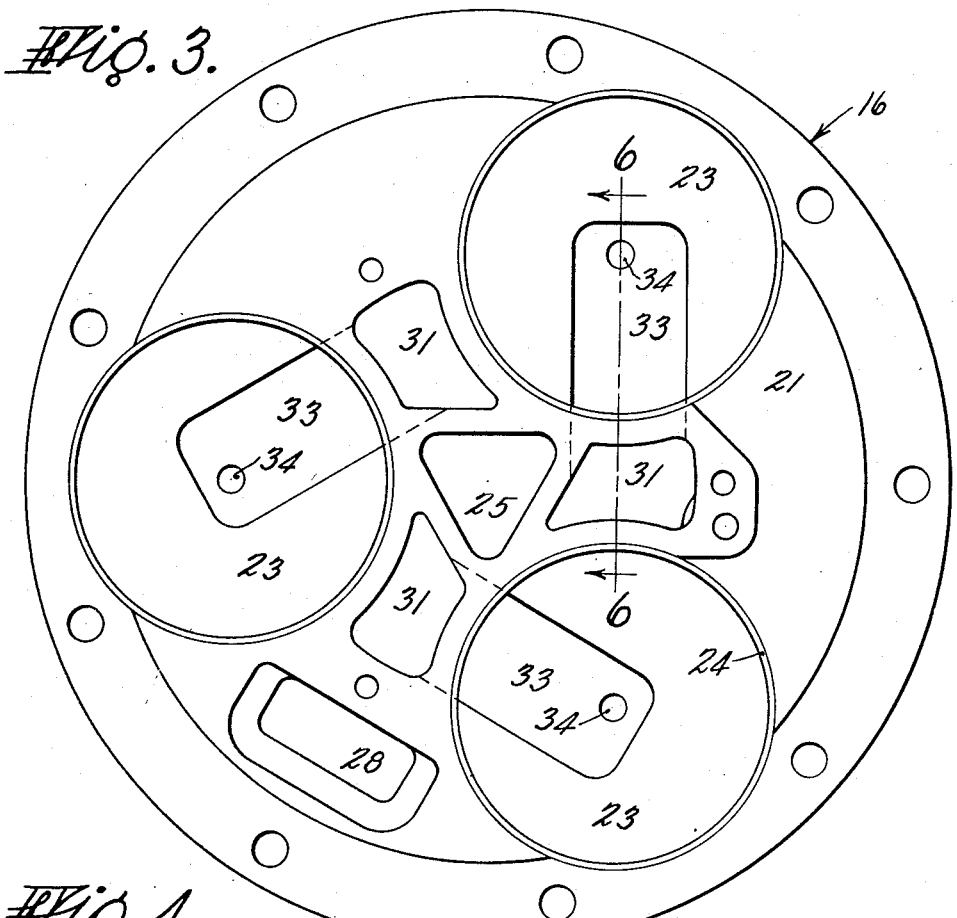
Fig. 3 is a top plan view of the cylinder block or lower casing member.
Figure 6:
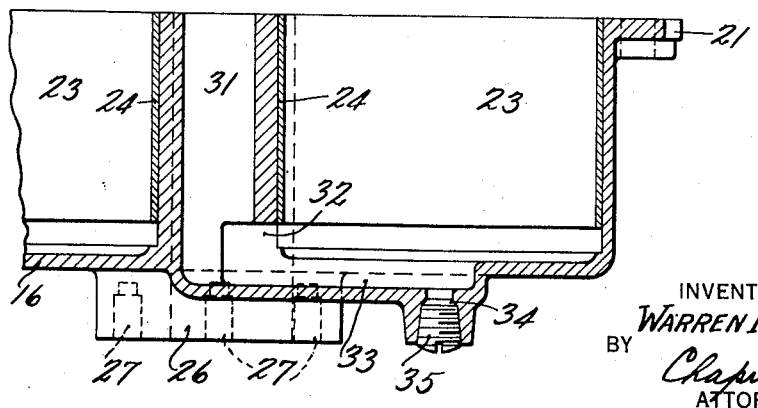
Fig. 6 is a fragmentary cross sectional view taken on the line 6—6 of Fig. 3.
Figure 7:
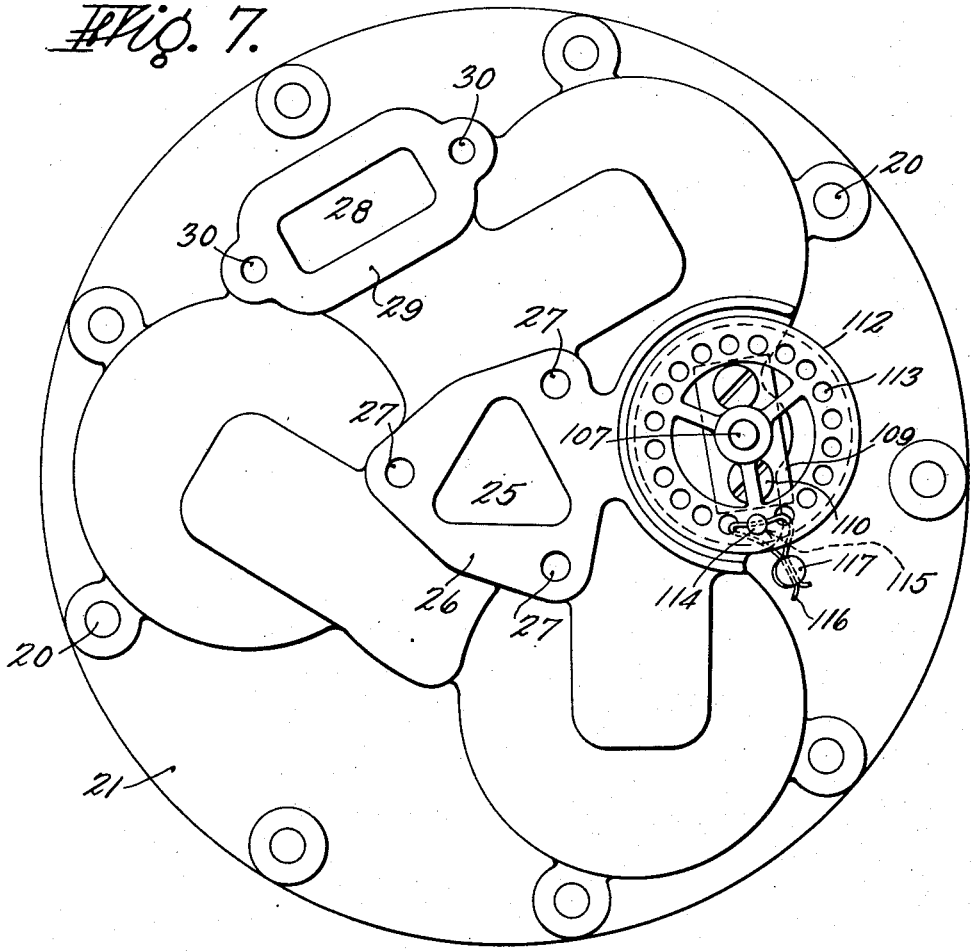
Fig. 7 is a bottom plan view of the meter.

The body member or cylinder block has formed therein as depending portions of the circular plate-like top 21, a circular series (three as shown in Fig. 3) of cylinders 23, disposed with their axes vertical and equally spaced one from another angularly and equi-distantly spaced radially from the central vertical axis of the body and cover members. Each cylinder is open at its upper end and closed at its lower end. Each cylinder preferably has a thin tubular lining 24 of suitable material, such for example as brass. An outlet passage 25, substantially triangular in cross section, extends centrally and vertically through the body 16 from top to bottom thereof (Fig. 1). The bottom of body 16 has a faced flange 26 (Fig. 7) with a series of tapped holes 27 or is otherwise suitably formed for connection to discharge piping. An inlet passage 28 (Figs. 5 and 7) extends vertically through the body 16 from top to bottom thereof and opens into chamber 18 adjacent the peripheral wall thereof. The bottom of body 16 has a faced flange 22 (Fig. 7) and tapped holes 30 or is otherwise suitably formed for connection with inlet piping. Formed in the body 16 and between the cylinders are vertical ducts 31 (Figs. 1, 3 and 6), one for each cylinder, which are open at their upper ends and extend downwardly, terminating close to the bottoms of the cylinders. The lower end of each duct 31 communicates with the lower part of its cylinder 23 through an opening 32 (Figs. 1 and 6) in the peripheral wall thereof. In the bottom wall of each cylinder is a sump 33 and leading downwardly therefrom is a drain passage 34, normally closed by a plug 35.

Figure 4:
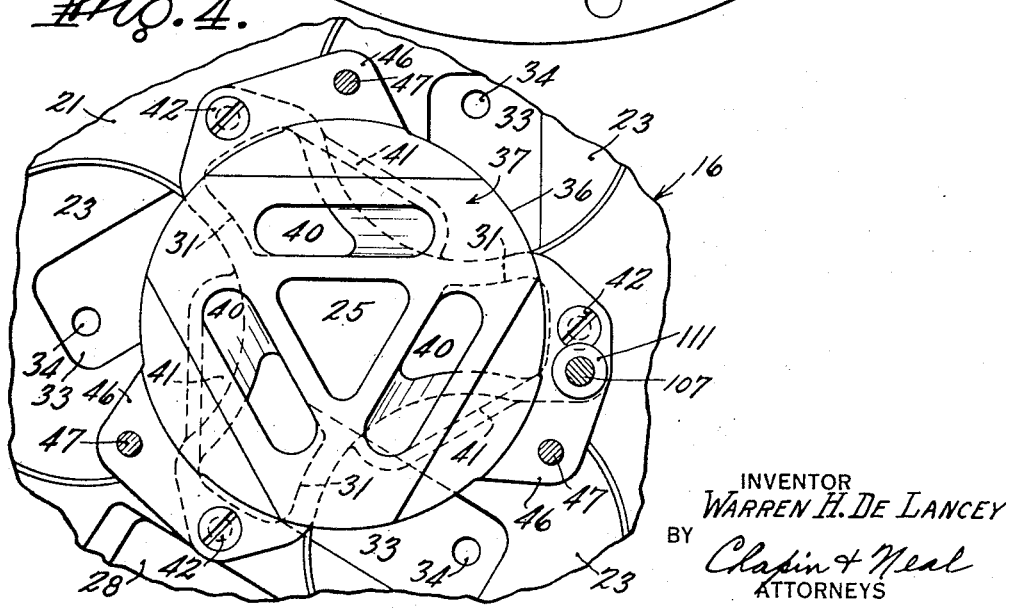
Fig. 4 is a similar but fragmentary view showing the central portion of the cylinder block as it appears after assembly of the valve block thereon.

Resting upon the top of plate portion 21 (Figs. 1 and 4), and located centrally thereof, is a ported member 36 of suitable material, such as bronze for example, the top face of which is suitably finished to form a seat 37 for the valve 38 of the meter. This member 36 has a central outlet port 39 which is of the same cross sectional shape as passsage 25 and registers therewith. The member 36 also has a series of elongated ports 40 equally spaced around the central port 39. Passages 41 in the member connect these ports 40 one to each of the ducts 31. Each port 40 has parallel sides which parallel the adjacent side of the substantially triangular port 39 and semi-circular ends. The member 36 is secured by cap screws 42 to the member 21. The member 36 further is provided with a series of ears 43 projecting radially outwardly therefrom.

A tripod (Figs. 1 and 5), having a circular top 44 and three supporting legs 45 with feet 46 is supported from the block 36—the feet 45 resting one on each of the ears 43 and being secured thereto by cap screws 47. The top 44 has a centrally-located, rectangular hole 48 therethrough and a pair of laterally-spaced, upstanding ears 49 located one on each of two opposite sides of said hole. The peripheral wall of top 44 is screw-threaded and engaged therewith like a nut for vertical movement, when rotated, is an annular member 50, the upper face of which affords a track 51. This member 50 is formed with gear teeth 52.

The tripod supports by means of a universal joint, preferably of the gimbal type, the wobble plate of the meter (Fig. 1). This plate 53 is circular in plan and of upwardly-dished cross-sectional shape with an annular bead 54 of rounded cross section embordering its lower face and designed to engage track 51. The plate 53, together with a central shaft 55 which extends above and below the plate in coaxial relation therewith, may be formed in one piece as a die casting. The axis of shaft 55 lies at right angles to the plane of the track-engaging part of bead 54. At a point just beneath plate 53, the shaft 55 has a rectangular hole 56 therethrough to receive a block 57 (see also Fig. 5) which is mounted to rock on a pin 58 fixed at its ends one in each of two opposite walls of said hole. Such walls may likewise be considered as a pair of ears depending from the wobble plate. This block 57 is also mounted to rock on the trunnion-like ends of two studs 59, fixed one in each of the ears 49 on the tripod top 44. The common axis of the studs 59 lies at right angles to the axis of pin 58 and both these axes lie in the plane of the track-engaging surface of bead 54. The wobble plate is thus supported by a gimbal joint which, like a ball and socket type of universal joint, enables the necessary nutating movement of the plate but unlike the ball and socket type, the gimbal joint prevents rotation of the plate on its axis and holds the plate against axial displacement, both upwardly and downwardly. The wobble plate 53 (Fig. 1), has three pairs of ears 60 projecting radially outward from its periphery,—each pair being spaced 120 degrees from the other two. Strengthening webs 61 extend from the upper part of shaft 55 radially outwardly along the top face of plate 53, one to each said pair.

Slidable in each cylinder 23 is a suitable piston 62 (Fig. 1) having a vertically upstanding rod 63. The upper end of each rod 63 is forked to receive a member 64 (Figs. 1 and 16) mounted to rock on a pin 65 fixed at its ends one in each arm of the fork. This member likewise fits between a pair of ears 60, and a pin 66 located at right angles to pin 65 passes through the block and ears 60 and is suitably fixed to the latter. Each piston rod is thus connected to the wobble plate by a gimbal type of universal joint. The pins 65 and 66 are spaced one above the other on opposite sides of, but very close to, the aforesaid plane of the track-engaging surface of bead 54 of the wobble plate.

Figure 8:
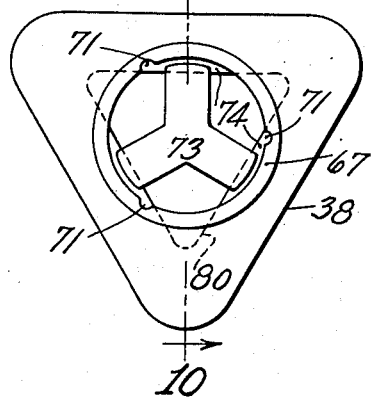
Figs. 8 and 9 are top plan views of the lower and upper valve parts, respectively.
Figure 9:
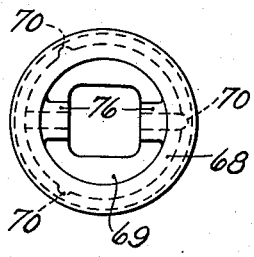
Figure 10:
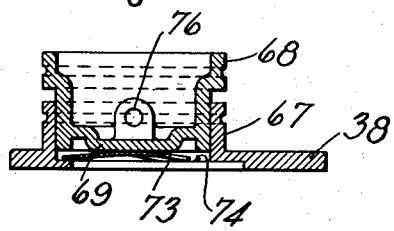
Fig. 10 is a cross sectional view showing the valve parts assembled.

The lower and depending end of the wobble plate shaft 55 actuates the valve 38. This valve, according to one form of the invention, is made in two parts shown separately in Figs. 8 and 9, and in assembled relation in Figs. 1, 10, and 11. The lower part includes a tubular portion 67 upstanding from the triangular base which forms the valve proper and which rests upon and is slidably engaged with the valve seat 37. The upper part 68 is connected by means of a gimbal joint (Figs. 1 and 11) to the lower end of shaft 55, and is cylindrical and partly telescoped in the open upper end of the bore of the lower part. The upper part is a piston-like member and closes the top of the tubular portion 67. Its base 69 is acted on by the pressure of liquid in chamber 17 with a downward thrust. The two valve parts are relatively slidable vertically but cannot turn the one relatively to the other because of the engagement of keys 70 (formed on part 68) in vertical grooves 71 formed in the bore of part 67. A tube 72 (Fig. 1) of flexible material joins the two valve parts, being bound tightly at its ends one to part 67 and one to part 68. This tube prevents liquid from reaching the interior of tube 67 but allows free vertical movement between the parts 67 and 68. A flat spring 73 (Figs. 8 and 10) bearing at its center against the base of the part 69 has three radial prongs which bear at their outer ends against the tops of flanges 74 on the member 67, and tends to press valve 38 against its seat. A member 75 fits between two hubs 76 (Figs. 1, 10 and 11) on member 69 and has squared end faces to engage the squared end faces of the hubs. This member can rock relatively to member 69 on trunnions 77 mounted one in each of the hubs 76. The member 75 has two other squared faces (Fig. 11) at right angles to the first-named faces and these are overlapped by the arms 78 of the fork formed on the lower end of shaft 55. A pin 79 passes through the arms 78 and member 75 with its axis at right angles to the common axis of trunnions 77. Thus, the upper valve part 67 is supported by the lower end of the shaft of the wobble plate by a gimbal joint in such a way that it cannot rotate about its vertical axis and, since the valve part 68 is held from turning relatively to the part 67 by the keys 70 and keyways 71, the valve itself cannot rotate about its central vertical axis. The wobble plate, being held against rotation on its own axis by the upper gimbal joint, shaft 55 cannot rotate about its axis. The valve 38, because of the gimbal joint connection can slide parallel with and maintain contact with seat 37 while the lower end of shaft 55 describes its circular path. The valve 38 is relieved of much of the liquid pressure which would otherwise thrust it against its seat 37, because of the upper part 68. The downward thrust of liquid pressure acts on the full circular area of this part and the valve is shielded from and relieved of this much of the pressure because the thrust on part 68 is transmitted by the shaft 55 and its two gimbal joints to the fixed support 44. The valve 38 is thus relieved of much of the pressure thrust and the only parts left exposed to the inlet pressure are those portions of valve 38 which project beyond its tubular part 67. The valve 38 is of the form of an equilateral triangle except that the corners are rounded off as shown. The valve 38 has a central opening 80 therethrough of the same shape.

An alternative form of valve is shown in Figs. 14 and 15. The valve 38' has the same modified triangular form, as above described, but instead of the triangular opening therethrough, the valve 38' has a recess 80' in its bottom of the same size and form, as viewed in plan, as the opening 80. This valve 38' is not supported by the wobble plate shaft 55', as above described. Instead, this shaft has fixed in its lower end a pin 81, the lower end 82 of which is in the form of part of a ball or sphere, the curved surfaces engaging the peripheral wall of a vertical hole 82' formed in the top wall of the valve. The arrangement enables relative vertical movement between the wobble plate shaft and valve while maintaining an operable ball and socket connection.

With a ball and socket connection, as distinguished from the gimbal joint type of universal joint connection used with valve 38, it is possible for the valve 38' to rotate about its own axis and some supplementary connection between the valve and wobble plate shaft must be provided to prevent this action. As shown, the shaft 55' of the wobble plate has near its lower and valve-actuating end two flat parallel walls 83 (Fig. 15) which are engaged by the arms 84 of the forked end of a link 85. A pin 86 connects arms 84 and shaft 55' so that the link is pivoted to swing up and down on a horizontal axis. The outer end of link 85 is downturned and has a hole therein in which the protruding end of a horizontal pin 87, fixed in valve 38', extends. This hole (Fig. 14) is so formed as to allow free rocking movement of link 85 on its pivot 86. The pin 87 has its axis disposed at right angles to pin 86. Thus, the valve cannot turn about its central vertical axis because of link 85 and the latter cannot turn relatively to shaft 55' and this shaft cannot turn because of the gimbal joint which supports the wobble plate.

The upper end of the shaft of wobble plate 53 has fixed therein a stud 89 (Fig. 1,) bearing a roll 90 which engages one or the other of two webs 91, depending from the lower face of a disc 92 and disposed in diametrically opposed relation. Disc 92 is fixed to the lower end of a shaft 93, rotatably mounted in bearings one in the central upper portion of cover 17 and another in a cover plate 94, secured by cap screws 95 to cover 17. Between the lower bearing and plate 94 is a chamber 96 in which are located two seal rings 97 and a spring 98, both rings and springs encompassing shaft 93. The spring spreads apart the rings 97 and holds them, one in sealing engagement with the upper end face of the lower bearing and the other in sealing engagement with the lower face of the upper bearing. On the upper end of shaft 93 and above plate 94 is fixed a pinion 99 (Figs. 1 and 2) which meshes with a gear 100, rotatably mounted on a stud 101, fixed to the outer top wall of cover 17. The hub of gear 100 has a hollow tubular extension 102 which projects beyond the head of stud 101 and has diametrically opposed slots 103 in its side wall. This part 102 is intended to receive one end of a flexible coupling on the drive shaft of a suitable register, not shown. A pressed metal case 104 is secured by cap screws 105 to cover 17 to enclose the exposed end of shaft 93 and gears 99 and 100 leaving only the extension 102 exposed.

For the purpose of calibrating the meter, means are provided for rotating gear 52 from a point outside the casing of the meter, whereby the track 51 may be raised or lowered to thereby vary the stroke of the pistons of the meter and thus the amount of liquid displaced therefrom. For this purpose, a pinion 106 (Figs. 5 and 13) meshes with gear 52 and is fixed on the upper end of a vertical shaft 107. This shaft has an upper bearing in the valve seat block 36 (Fig. 13) and a long lower bearing in the body 16, extending out through a stuffing box 108 in the bottom wall of the body. A gland 109, movable by cap screws 110, threaded into the bottom wall of body 16, serves to compress the packing around shaft 107 and prevent leakage. A collar 111 on shaft 107 engages the upper face of the bearing block 36 and this, together with a hand wheel 112 (see also Fig. 7) fixed on the lower end of the shaft, serves to prevent undue axial displacement of shaft 107. The hand wheel has a circular series of holes 113 (Fig. 7) in any one of which a sealing pin 114 may be engaged—the inner end of such pin fitting into a hole 115 in the bottom wall of body 16 to prevent rotation of the hand wheel. The outer end of pin 114 is perforated to receive a sealing wire 116 which may also be passed through one of the unoccupied holes 113 and have its ends joined by a lead seal 117, as indicated, to guard against unauthorized removal of the pin.

The pistons may be of any suitable construction and the construction shown, while desirable and preferred, may be varied as desired. The piston, as shown herein in Fig. 1, includes a die cast body 118, having a central, upstanding, interiorly threaded hub 119; an upstanding annular flange 120 surrounding the boss and coaxially disposed but radially spaced therefrom; and a flat annular upper face 121. A cupped piston leather 122 has its annular portion engaging face 121 and the flange 120 serves to center the leather on the piston body. A flat washer 123 rests upon this portion of the leather. Resting at its central portion on the top end face of hub 119 is a pressed metal plate 124. The piston rod 63 is threaded at its lower end into hub 119 and a nut 125 on the rod serves to clamp the central portion of plate 124 to the hub of the piston body. Member 124 has a downturned cylindrical part 126 which telescopes over flange 120 and, extending from the lower end of portion 126 is a flat annular portion 127 which presses against the washer 123 and holds the annular part of piston leather 122 against face 121 of the piston body. Encompassing the portion 127 is a portion 128 which is of quarter round cross section and which, together with washer 123, serves to retain a spring 129 that presses the cylindrical portion of the piston leather against the wall of its cylinder.

In operation, liquid is supplied under pressure to the inlet passage 28 and enters and fills the chamber 18, flowing into the open upper ends of the cylinders 23. The tops of the pistons 22 are thus continuously subjected to the pressure of the liquid acting on them with a tendency to move them downward. Whenever the valve 38 connects one of the cylinder ducts 31 to the outlet passage 25, the piston in that cylinder will be forced downwardly by the pressure of liquid acting on its top, thus expelling the liquid previously drawn into the cylinder below the piston and also imparting a downward pull to the wobble plate 53. The valve 38, moved in an orbital path by the wobble plate without rotation about its own axis, successively connects the cylinders to the outlet 25 so that the wobble plate is pulled down first by one piston, then by the next in the series and then by the last in the series, whereby the wobble plate is given a movement of nutation and the ends of its shaft 55 caused to describe circular paths. The valve also successively connects each duct 31 to the chamber 18, thereby admitting liquid to the lower ends of cylinders 23. Under such condition the piston 22 is substantially balanced against the inlet pressure and does not contribute to or resist movement of the wobble plate. Each piston starts its downward stroke before the preceding piston in the series has completed its downstroke, wherefore the power strokes overlap and continuous movement is imparted to the wobble plate and continuous discharge of liquid from the outlet of the meter is effected. The movement of the wobble plate acts through the upper part of shaft 55 or 55' to rotate shaft 93 and drive the counter or register through the gearing 99—100 in the usual way.

The valve 38' functions in exactly the same manner as valve 38 so far as operation of the meter is concerned.

The stroke of each piston is limited in both directions by the engagement of the wobble plate 53 with track 51. Consequently, by raising or lowering this track by the means disclosed, the stroke may be diminished or increased, respectively, for calibration purposes.

The invention provides a considerably simplified and improved structure, as measured by the meters of this type found in the prior art. Heretofore, special means have been provided to hold the wobble plate against upward displacement and against rotation on its axis. By using a gimbal joint instead of a ball and socket joint at the center of the wobble plate, I am enabled to accomplish both these functions and to dispense with special parts previously used for the purpose. Some kind of a universal joint is necessary to support the wobble plate for its movement of nutation and the type chosen serves this purpose and also accomplishes other purposes which previously has necessitated additional parts. The use of gimbal joints between the piston rods and wobble plate and between the wobble plate and valve is preferred because of the substantial reduction in friction.

The valve arrangement, whereby the valve is held from turning on its own axis by the use of a gimbal joint between it and the shaft of the wobble plate, is also considered important because of simplification of structure. This arrangement also enables the valve to be relieved of much of the pressure thrust—much of such thrust being transmitted through the wobble plate to its support 44. The valve construction shown in Fig. 1 enables the meter to operate backward when subjected to back pressure, the valve being held to its seat against such back pressure.

The invention thus provides a wobble plate meter of simplified and improved construction, calculated to enable important economies in manufacture without sacrifice to its effectiveness in operation.

What I claim is:

1. A meter, comprising, cooperating casing elements affording between them a housing having an inlet and an outlet, one said element having a circular series of cylinders grouped about a central axis and a ported valve seat and ducts communicating one with each cylinder, a support fixed to one element and spaced from said seat, a wobble plate, a gimbal joint connecting the wobble plate at its central axis to said support and restraining rotation of such plate about its said axis, a projection on the wobble plate extending toward said valve seat and terminating with an end alined with the axis of the plate, pistons reciprocable in said cylinders and operatively connected to said wobble plate, a valve slidably engaged with said seat to distribute liquid from the inlet successively to said ducts and from said ducts successively to said outlet, a universal joint connecting said end and valve, and a link interconnecting said end and valve and permitting relative movement thereof in a direction axially of the valve and preventing relative rotation thereof about said axis.

2. A meter, comprising, cooperating casing elements affording between them a housing having an inlet and an outlet, one said element having a circular series of cylinders grouped about a central axis and a ported valve seat and ducts communicating one with each cylinder, a support fixed to one element and spaced from said seat, a wobble plate, a gimbal joint connecting the wobble plate at its central axis to said support and restraining rotation of such plate about its said axis, a projection on the wobble plate extending toward said valve seat and terminating with an end alined with the axis of the plate, pistons reciprocable in said cylinders and operatively connected to said wobble plate, a valve slidably engaged with said seat to distribute liquid from the inlet successively to said ducts and from said ducts successively to said outlet, a universal joint connecting said end to the valve at its central axis, and a link pivoted to said end on an axis parallel to said seat to swing toward and away from said valve and pivotally connected to the valve at a point spaced from the axis of the valve.

3. A meter, comprising, cooperating casing elements affording between them a housing having an inlet and an outlet, one said element having a circular series of cylinders grouped about a central axis and a ported valve seat and ducts communicating one with each cylinder, a support fixed to one element and spaced from said seat, a wobble plate, a gimbal joint connecting the wobble plate at its central axis to said support and restraining rotation of said plate about its axis and axial movement thereof, a projection on said wobble plate extending toward said valve seat and terminating with an end alined with the axis of the plate, pistons reciprocable in said cylinders and operatively connected to said wobble plate, a valve slidably engaged with said seat to distribute liquid from the inlet successively to said ducts and from said ducts successively to said outlet, said valve having a coaxial tubular part extending toward said end, a piston-like member slidably and telescopically engaged with said tubular part, a gimbal joint interconnecting said end and piston-like member, whereby the pressure of the liquid in said housing acts on said piston-like member and the thrust is taken by said projection and transmitted through the wobble plate and said first-named joint to said support, and interengaging means on said piston-like member and tubular part for preventing relative rotation thereof.

4. A meter, comprising, a cylinder block having a circular series of open-topped cylinders grouped around a central axis and a ported valve seat with ducts therefrom to the cylinders, and an outlet passage, a cover superposed on said block and forming therewith an inlet chamber, a valve slidable on said seat to successively connect said ducts to the chamber and to successively connect said ducts to said passage, a central support fixed to and upstanding from said block and overlying the valve and having an annular track concentric with said axis, a wobble plate having a plane annular surface for engagement with said track and a pair of spaced depending ears, a pair of spaced upstanding ears on said support and at right angles to said first-named ears, and a member located between all said ears and pivotally connected to each pair on axes which are disposed at right angles and which both lie in the same plane and in the plane of said track engaging surface of the wobble plate, and a member depending from said plate and having a coaxially disposed terminal end connected by a universal joint to said valve.

WARREN H. DE LANCEY.